No. 785,996. PATENTED MAR. 28, 1905.
O. ARENDT & P. HOLTZMANN.
PUMP VALVE.
APPLICATION FILED JUNE 13, 1904.

Witnesses
Edward Rowland
R. A. Etherson

Inventors
Otto Arendt & Philip Holtzmann
By their Attorney
J. W. Parker

No. 785,996. Patented March 28, 1905.

UNITED STATES PATENT OFFICE.

OTTO ARENDT, OF NEWARK, NEW JERSEY, AND PHILIP HOLTZMANN, OF NEW YORK, N. Y.

PUMP-VALVE.

SPECIFICATION forming part of Letters Patent No. 785,996, dated March 28, 1905.

Application filed June 13, 1904. Serial No. 212,442.

*To all whom it may concern:*

Be it known that we, OTTO ARENDT, residing at Newark, in the county of Essex and State of New Jersey, and PHILIP HOLTZMANN, residing in the borough of Brooklyn, in the city, county, and State of New York, citizens of the United States, have invented certain new and useful Improvements in Pump-Valves, of which the following is a specification.

The object of our invention is to provide a pump-valve composed of soft rubber or an analogous composition having an internal metallic reinforcement consisting of a thimble having a concentric flange connected therewith by radial arms and said concentric flange having three or more radial projections extending out to the peripheral face of the valve, said projections being intended to form rigid engaging surfaces whereby the valve may be securely held within the jaws of a lathe-chuck during the operation of reaming out the bore of the thimble to adapt the latter for the valve-spindle.

Figure 1:
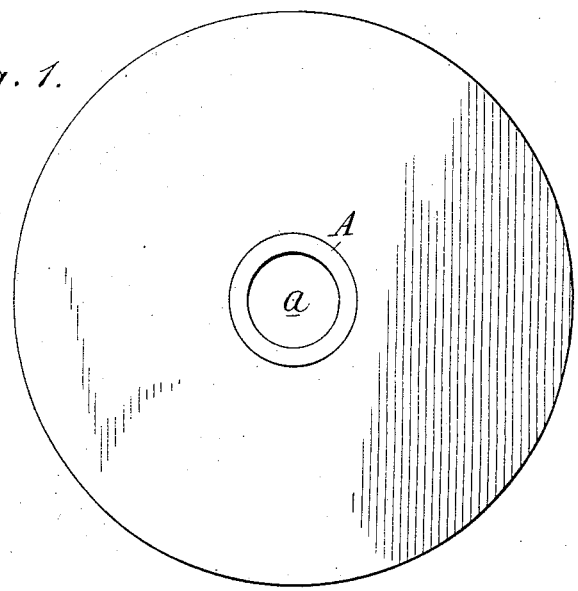
Figure 2:
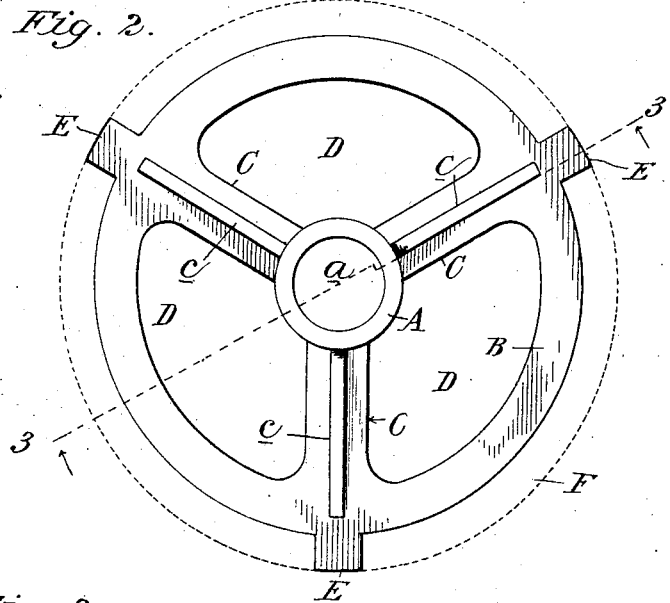
Figure 3:
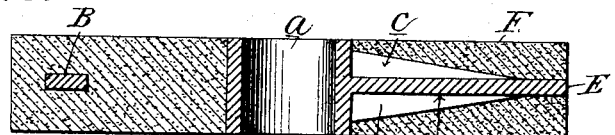

In the drawings accompanying this application, Figure 1 is a plan view of our complete valve. Fig. 2 is a plan view of the metallic reinforcement for the valve, the outer concentric dotted line indicating the periphery of the valve; and Fig. 3 is a cross-sectional view taken on the line 3 3 of Fig. 2.

In producing our improved valve we provide a metallic structure wherein letter A indicates a thimble having an internal bore $a$, adapted to slide upon a valve-spindle. (Not shown.) B indicates a concentric rim. C indicates each of several radial arms connecting said thimble and rim. When the said metallic formation is of very thin material, the same may be reinforced by the vertically-disposed ribs $c$, extending at both sides of the radial arms C, or, if desired, said metallic formation may be of a thickness to possess sufficient rigidity without the use of said ribs. We may refer herein to said metallic formation as a metallic "disk," not being limited to the particular structure thereof indicated in the drawings, only requiring it to have the outward concentric formation represented and to be provided with interior openings, as those represented by the letter D, to permit rubber molded about said disk to meet or afford a continuous structure through said disk to prevent dislodgment. Extending from the periphery of the disk are the radial projections E, three of such projections being herein shown, although such particular number is not arbitrary, the said projections E, however, all terminating in the same concentric plane for a purpose to be described hereinafter.

Our improved disk aforesaid is placed in a mold adapted to receive it, and rubber or a vulcanizable substance in a plastic state is then applied about said disk to form therewith a flat cylindrical valve, as F, all parts of the disk aforesaid being covered by the rubber or the like excepting only the opposite faces of the thimble (which lie flush with the respective opposite surfaces of the rubber part of the valve) and the outer faces of the projections E, (which also lie flush with the outer concentric periphery of the rubber portion of the valve as molded.) Thus our improved valve as produced, the same being duly vulcanized, appears as a plain rubber valve; but in practice said valve is so reinforced by the described means that it is not capable of acquiring the defect of "cupping," which is common to ordinary rubber valves of this character. Furthermore, our improved valve as constructed is capable of being placed within the jaws of a lathe-chuck, which obtain a firm grip thereon against the projections E, whereby the bore $a$ of the thimble may be reamed out to permit said bore to fit over a valve-spindle of greater diameter and whereby said bore may be fitted with a bushing of suitable capacity to fit a valve-spindle of smaller diameter. A further advantage arising from the ability to support the valve in a lathe-chuck resides in the fact that thereby the valve may be refaced when necessary.

Having now described our invention, we declare that what we claim is—

1. As a new article of manufacture, a pump-valve comprising a metallic disk having a continuous body of vulcanizable material molded about and inclosing said disk, and radial projections from said disk extending out to the peripheral surface of said rubber body to avoid "cupping" and afford gripping-points whereby the valve may be held between the jaws of a chuck.

2. A pump-valve which consists of an apertured metallic disk provided with a central bore and having radial projections extending from its periphery, together with a continuous valve-body of vulcanizable material molded about said disk, the peripheral surface of said body being flush with the outer concentric plane of said projections.

OTTO ARENDT.
PHILIP HOLTZMANN.

Witnesses:
F. W. BARKER,
R. A. ETHERSON.